(12) United States Patent
Paweletz et al.

(10) Patent No.: US 10,541,594 B2
(45) Date of Patent: Jan. 21, 2020

(54) ELECTRICAL LINEAR MACHINE

(71) Applicant: Robert Bosch GmbH, Stuttgart (DE)

(72) Inventors: Anton Paweletz, Fellbach (DE); Li Xiang, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 374 days.

(21) Appl. No.: 15/324,692

(22) PCT Filed: May 22, 2015

(86) PCT No.: PCT/EP2015/061403
§ 371 (c)(1),
(2) Date: Jan. 7, 2017

(87) PCT Pub. No.: WO2016/008627
PCT Pub. Date: Jan. 21, 2016

(65) Prior Publication Data
US 2017/0207690 A1    Jul. 20, 2017

(30) Foreign Application Priority Data

Jul. 15, 2014 (DE) .......................... 10 2014 213 713

(51) Int. Cl.
*H02K 41/03* (2006.01)
*H02K 11/33* (2016.01)
*H02K 11/20* (2016.01)

(52) U.S. Cl.
CPC ............. *H02K 41/03* (2013.01); *H02K 11/20* (2016.01); *H02K 11/33* (2016.01)

(58) Field of Classification Search
CPC ........ H02K 11/20; H02K 11/33; H02K 33/02; H02K 41/03; H02K 41/031
See application file for complete search history.

(56) References Cited

U.S. PATENT DOCUMENTS

| 7,078,832 B2 * | 7/2006 | Inagaki | ................. F04B 35/045 |
| | | | 310/12.19 |
| 2010/0176679 A1 * | 7/2010 | Ichiyama | ............... H02K 16/00 |
| | | | 310/156.35 |

(Continued)

FOREIGN PATENT DOCUMENTS

| DE | 100 55 078 C1 | 6/2002 |
| JP | 62-171455 A | 7/1987 |

(Continued)

OTHER PUBLICATIONS

International Search Report corresponding to PCT Application No. PCT/EP2015/061403, dated Oct. 23, 2015 (German and English language document) (5 pages).

*Primary Examiner* — Jue Zhang
*Assistant Examiner* — Bart Iliya
(74) *Attorney, Agent, or Firm* — Maginot, Moore & Beck LLP

(57) ABSTRACT

An electrical linear machine includes a stator that is fixed to a housing and an armature that is configured to be axially displaced and supports a permanent magnet. The stator has a first stator yolk and a second stator yoke with the stator yolks each forming a stator pole. The stator poles are arranged in a manner distributed radially and uniformly around the armature. The first stator yoke is associated with at least one coil to which current is applied so as to generate a first magnetic flux through the first stator yoke and the permanent magnet. A magnetic north pole of the permanent magnet is associated with a stator pole of the second stator yoke and a magnetic south pole of the permanent magnet is associated with the other stator pole of the second stator yoke in order to generate a second magnetic flux through the second stator yoke.

11 Claims, 5 Drawing Sheets

(56) References Cited

U.S. PATENT DOCUMENTS

| | | | | |
|---|---|---|---|---|
| 2010/0301686 A1* | 12/2010 | Takahashi | ............ | H02K 33/12 |
| | | | | 310/36 |
| 2011/0204738 A1* | 8/2011 | Helle | ............ | G01R 33/1215 |
| | | | | 310/156.01 |
| 2011/0254386 A1* | 10/2011 | Liu | ............ | H02K 7/1869 |
| | | | | 310/12.25 |
| 2011/0291532 A1* | 12/2011 | Takeuchi | ............ | B60L 58/40 |
| | | | | 310/68 B |
| 2013/0082545 A1* | 4/2013 | Goto | ............ | H02K 41/02 |
| | | | | 310/12.24 |
| 2015/0372580 A1* | 12/2015 | Lucas | ............ | H04R 9/027 |
| | | | | 381/418 |

FOREIGN PATENT DOCUMENTS

| JP | 2002-112520 A | 4/2002 |
|---|---|---|
| JP | 2008-206356 A | 9/2008 |

\* cited by examiner

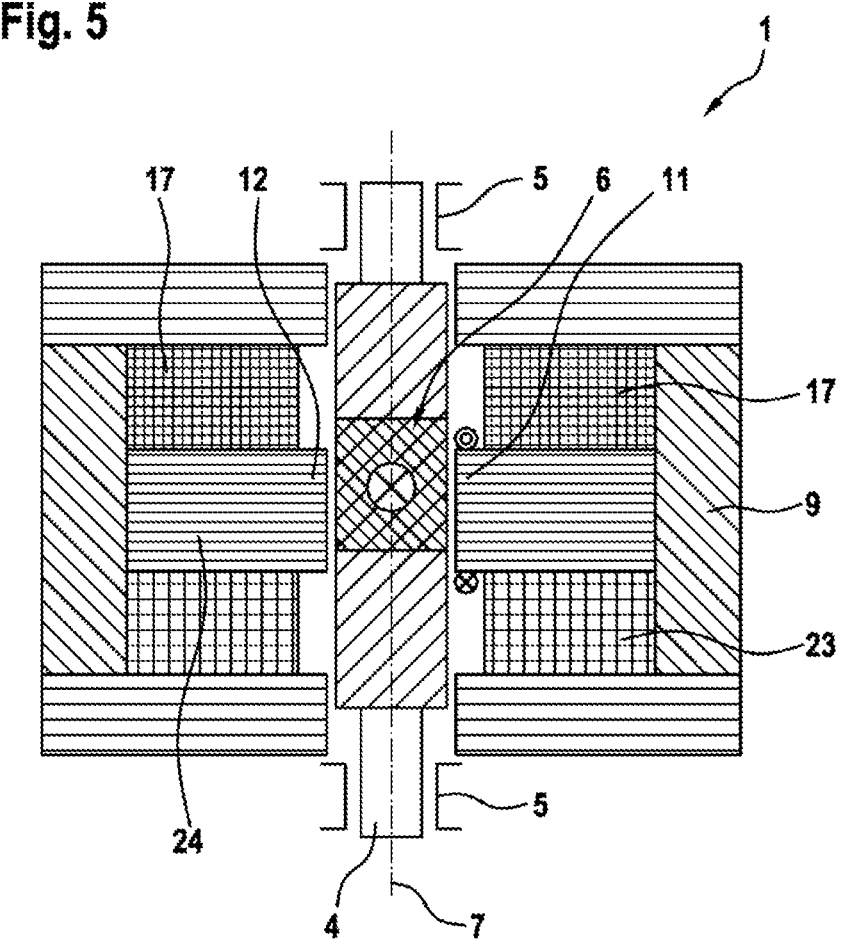

ELECTRICAL LINEAR MACHINE

This application is a 35 U.S.C. § 371 National Stage Application of PCT/EP2015/061403, filed on May 22, 2015, which claims the benefit of priority to Serial No. DE 10 2014 213 713.6, filed on Jul. 15, 2014 in Germany, the disclosures of which are incorporated herein by reference in their entirety.

BACKGROUND

The disclosure relates to an electrical linear machine having a stator that is fixed to the housing, and having an armature that can be relocated in an axial manner and that supports a permanent magnet.

Electrical linear machines are fundamentally known. By way of example the unexamined German application DE 100 55 078 C1 thus discloses an electrical linear machine that operates as an electrical reluctance machine in accordance with a transverse flux principle in which in other words a magnetic flux extends in a transverse manner (transversal) with respect to the direction of movement of an oscillating armature (oscillator). By virtue of electrically exciting this linear machine, it is intended to overcome disadvantages that arise with linear machines that generate the magnetic flux by means of providing permanent magnets. In particular, it is intended thereby to overcome the disadvantage that the degree of efficiency of linear machines that are excited by permanent magnet rapidly decreases at higher operating temperatures owing to a reversible demagnetization or said linear machines can be permanently damaged in the event of an irreversible demagnetization.

Furthermore, the unexamined Japanese application JP 2008-206356 A discloses a linear machine in which the multiple permanent magnets and also two electrically excitable coils are provided to operate the machine. It is necessary to fix the permanent magnets by means of non-magnetic elements which means an additional outlay in construction and material costs, in particular if high operating temperatures are to be expected.

SUMMARY

The electrical linear machine in accordance with the disclosure has the advantage that a simple construction is provided at low costs (in particular by means of simple, standardized lamination of the magnetic circuit with magnetic steel sheets) that in particular permanently ensures an oscillating operation of the armature. In particular, because merely one coil that can be energized is necessary to operate the electrical machine in accordance with the disclosure, the construction and also the control of the electrical machine is simple and particularly precise in comparison to known electrical machines.

The electrical machine in accordance with the disclosure is characterized by virtue of the fact that the stator comprises a first and a second stator yoke that form in each case two stator poles, wherein the stator poles are arranged distributed radially and uniformly around an armature, and wherein at least one coil that can be energized so as to generate a first magnetic flux through the first stator yoke and the permanent magnet is allocated to the first stator yoke, and wherein a magnetic north pole of the permanent magnet is allocated to a stator pole of the second stator yoke and a magnetic south pole of the permanent magnet is allocated to the other stator pole of the second stator yoke in order to generate a second magnetic flux through the second stator yoke. The stator comprises in other words two stator yokes that in each case form two stator poles. The stator poles are arranged uniformly spaced with respect to one another by means of their arrangement distributed uniformly over the periphery of the armature. Expediently, the stator poles of a stator yoke lie opposite one another. The armature having the permanent magnet lies in the air gap between the stator poles. The north pole is allocated to one stator pole of a stator yoke and the south pole is allocated to the other stator pole of a stator yoke. The coil that can be energized is allocated to the other stator yoke. A first magnetic flux can be generated through the first stator yoke and through the second stator yoke in a magnetic manner. The electrical machine that is constructed in this manner generates both a magnetic transversal flux component as well as a magnetic longitudinal component that act simultaneously in order to effect the relocation, in particular an oscillation of the armature in the axial direction. One coil suffices in order to operate the electrical machine that in this respect also operates preferably at least in part as a linear reluctance machine. In particular, the linear machine is embodied as a linear reluctance machine or as a hybrid linear reluctance machine.

In accordance with an advantageous further development of the disclosure, it is provided that at least one resilient element is allocated to the armature, said resilient element pre-stressing the armature in such a manner that the permanent magnet is located outside a magnetically neutral resting position. The term "neutral" or "magnetically neutral resting position" is to be understood as the position of the permanent magnet in which the permanent magnet is located in relation to the stator if external influences are not acting upon said magnet. The permanent magnet would move into a magnetically neutral resting position in relation to the stator poles if the coil is not energized and the resilient element is not provided. The armature is located in the non-energized state in a magnetically pre-stressed position by means of providing the resilient element that pre-stresses the armature in such a manner that the resilient element lies outside its resting position so that it is possible to reliably actuate said armature in a desired direction and in a short period of time.

Furthermore, it is preferably provided that the permanent magnet comprises a first magnetically neutral resting position that is determined by means of the permanent magnet and a second magnetically neutral resting position that is determined by means of the coil that is energized, wherein the first and the second magnetically neutral resting position are spaced axially from one another in the axial direction. The first neutral resting position is in this respect the above described resting position of the armature or the permanent magnet. The second neutral resting position is then achieved if the coil is energized and as a consequence an electrically excited magnetic flux is generated in the stator by means of which the armature is moved into a second position, namely the neutral energized position. In particular, the term "second neutral resting position" is to be understood to mean the position in which the coil is energized with the maximum current.

Moreover, it is preferably provided that at least one steel lamellae package is allocated to the permanent magnet in order to guide a magnetic flux. It is possible to influence the magnetic flux in relation to the permanent magnet by means of the steel lamellae package, in particular by means of aligning the steel lamellae.

In particular, the steel lamellae can be arranged and/or aligned in such a manner on the permanent magnet that a magnetic flux prevents or at least reduces in a specific direction and is preferably admitted in another direction. In particular, it is possible for the first magnetic flux that is excited by means of the coil to be guided past the permanent magnet, in particular without thereby impairing the second magnetic flux.

In accordance with a preferred further development of the disclosure, it is provided that in each case a steel lamellae package is arranged on the north pole of the permanent magnet and on the south pole of the permanent magnet and the steel lamellae of said steel lamellae package extend perpendicular with respect to the second magnetic flux. The lamellae thereby simultaneously extend parallel to the first magnetic flux. As a consequence, the first magnetic flux that is generated by means of the energized coil is guided past the permanent magnet by means of the steel lamellae while the second magnetic flux that is generated by means of the permanent magnet can follow the alignment or the natural magnetic field of the permanent magnet.

Furthermore, it is preferably provided that the stator poles comprise in each case a steel lamellae package whose steel lamellae extend in the direction of the respective magnetic flux to the permanent magnet. It is possible by means of providing the steel lamellae on the stator poles to advantageously guide the respective magnetic flux towards the air gap between the stator poles or between the stator poles and the permanent magnet. It is particularly preferred that the first and/or the second stator yoke are embodied altogether as steel lamellae package.

In accordance with a preferred further development of the disclosure, it is provided that the respective stator yoke is embodied in each case as an open stator ring whose free ends form one of the stator poles. By virtue of being embodied as an open stator ring, the respective stator yoke comprises two free ends that lie opposite one another and form the stator poles in this case. As a consequence, an advantageous magnetic flux is ensured both when excited using the permanent magnet as well as when excited electrically. The respective stator ring can be embodied in a circular, oval or square shape. The respective stator yoke particularly preferably comprises a projection that protrudes radially inwards (in other words facing in the direction of the stator poles or the air gap) on the side that lies opposite the slot or air gap in order to optimize the first magnetic flux that acts in the longitudinal direction of the armature.

Furthermore, it is preferably provided that the permanent magnet comprises a steel laminate package on an end face that faces inwards in relation to the first stator yoke and the steel lamellae of said steel lamellae package extend perpendicular to the second magnetic flux. As a consequence, the first magnetic flux is guided in particular in the direction of the projection of the corresponding stator yoke, said projection protruding radially inwards, as a result of which the magnetic resistance reduces and the magnetic flux is increased.

Moreover, in accordance with a preferred embodiment of the disclosure it is provided that a sensor device, in particular having sensor coils, is allocated to the second stator yoke so as to ascertain the second magnetic flux. While the coil that can be energized is allocated to the first stator yoke, a sensor device is allocated to the second stator yoke, said sensor device ascertaining the magnetic flux that is generated through the second stator yoke. The magnetic flux through the stator yoke changes in dependence upon the position of the permanent magnet in relation to the stator pole of the second stator yoke so that in dependence upon the ascertained magnetic flux it is possible to specify or determine the position of the permanent magnet and thereby of the armature in relation to the stator. It is preferred that the sensor device comprises a sensor coil that in particular is wound around the second stator yoke. It is possible in a simple and reliable manner by means of a simple construction of this type to ascertain the magnetic flux that is flowing through the second stator yoke.

Furthermore, it is preferably provided that a control unit is provided that energizes the coil in dependence upon the ascertained second magnetic flux. The control unit consequently evaluates the measured data relating to the magnetic flux, said data being ascertained by the sensor device, in order by way of example to determine the position of the permanent magnet and of the armature in relation to the stator. The control unit energizes the coil of the first stator yoke in dependence upon the ascertained position or the ascertained measured data in order to operate the linear machine. Since the position of the armature and in particular the permanent magnet in relation to the stator poles is now known, it is then possible to operate the electrical machine in a reliable and efficient manner by means of energizing the merely one coil.

It is preferred that a second coil is allocated to the first stator yoke, wherein the first coil and the second coil of the first stator yoke are separated from one another by means of a steel lamellae package ring, and wherein the permanent magnet of the armature is arranged in the region of the steel lamellae package ring in the resting position of said magnet. It is possible by means of providing a second coil that can be energized to increase by way of example the power that is produced by means of the linear machine and where appropriate to increase the frequency of the oscillating armature.

BRIEF DESCRIPTION OF THE DRAWINGS

The disclosure is to be further explained hereinunder with reference to the drawings. In the drawings:

FIG. 5 illustrates a second embodiment of the electrical linear machine, in each case in a schematic view.

DETAILED DESCRIPTION

Figure 1:
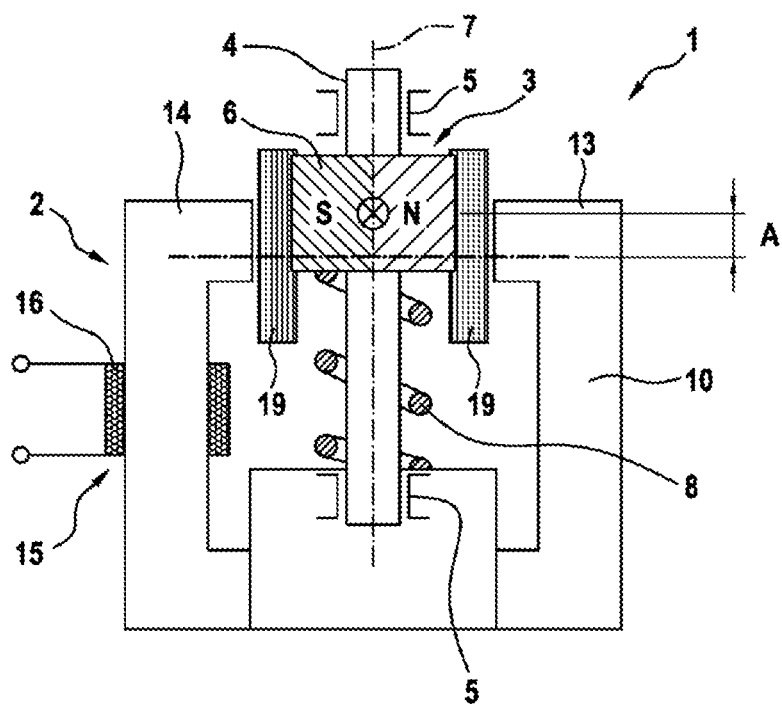
FIG. 1 illustrates a first exemplary embodiment of an electrical linear machine.

FIG. 1 illustrates schematically an electrical linear machine 1 that comprises a stator 2 that is fixed to the housing, and also an armature 3 that can be relocated in a linear or axial manner. The stator 2 is fixedly arranged for this purpose in a housing that is not further illustrated in this figure. The armature 3 comprises an armature shaft 4 that is held in the housing of the linear machine 1 by means of two linear bearing arrangements 5 (only illustrated schematically in this figure).

Furthermore, a permanent magnet 5 is arranged on the armature shaft 4 and connected in a fixed manner to the armature shaft 4. The permanent magnet comprises a magnetic north pole N and a magnetic south pole S. The magnetic axis is aligned through south pole and north pole perpendicular to the axis of displacement or the armature axis 7 of the armature 3. Moreover, a resilient element 8 in this case in the form of a coil spring, is arranged between the permanent magnet 6 and one of the linear bearing arrangements 5, said resilient element influencing the armature 3 with a resilient pre-stressing force that counteracts in particular a magnetic force that is further described hereinunder.

Figure 2:
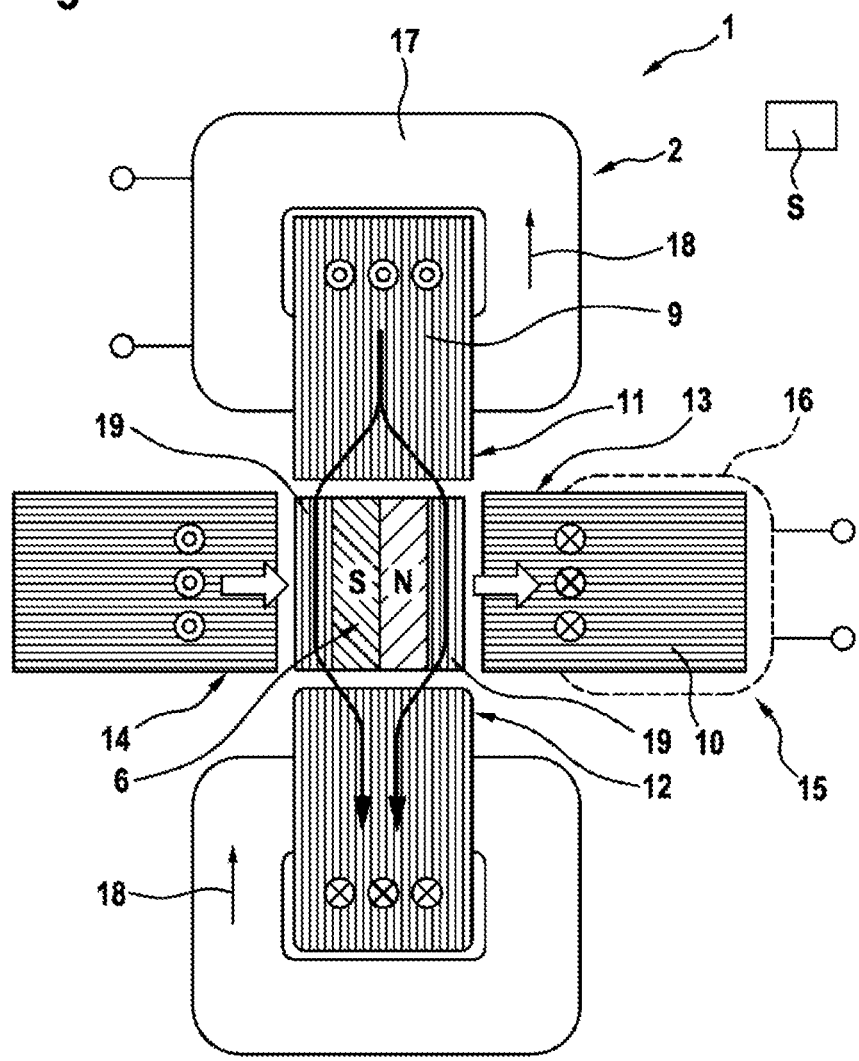
FIG. 2 illustrates a plan view of the linear machine, FIGS. 3A and B illustrate sectional views of the linear machine, FIGS. 4A and B illustrate a first magnetic flux and a second magnetic flux of the linear machine

FIG. 2 illustrates a plan view of the linear machine 1. The stator 2 comprises a first stator yoke 9 and also a second stator yoke 10. The two stator yokes 9, 10 are embodied as open stator rings in an essentially annular manner and comprise a slot or air gap so that said stator yokes form an open ring with two free ends that face one another. Each stator yoke 9, 10 forms on each of its free ends a stator pole 11, 12 or 13, 14. The stator poles 11 to 14 are arranged distributed uniformly around the periphery of the armature 3 so that in each case two stator poles 11, 12 or 13, 14 of the respective stator yoke 9, 10 lie opposite one another. The permanent magnet 6 is arranged in the air gap between the stator poles 11 to 14, wherein the magnetic south pole S is allocated to the stator pole 14 and the north pole N is allocated to the stator pole 13 so that the magnetic axis of the permanent magnet 6 leads from the stator pole 14 to the stator pole 13 of the stator yoke 10. If the permanent magnet 6 consequently is in the described position, said permanent magnet generates a magnetic flux through the second stator yoke.

Furthermore, a sensor device 15 is allocated to the stator yoke 10, said sensor device comprising a sensor coil 16 that is wound around the stator yoke 10 in order to ascertain a magnetic flux through the stator yoke 10. The magnetic flux through the stator yoke 10 that is generated by means of the permanent magnet 6 can consequently be sensed or ascertained by means of the sensor device 15. A coil 17 that can be energized is allocated to the first stator yoke 9 and said coil is wound around the stator yoke 9. A current flow in the direction of an arrow 18 is generated around the stator yoke 9 by means of energizing the coil 17, wherein a magnetic flux is generated by means of the current flow that is generated in the stator yoke 9, said magnetic flux leading from the stator pole 11 to the stator pole 12 as indicated by means of the arrow.

In each case a steel lamellae package 19 is arranged on the side of the magnetic north pole N and the magnetic south pole S on the permanent magnet 6. The steel lamellae of the respective steel lamellae package 19 extend perpendicular to the magnetic flux that is generated by means of the permanent magnet 6 so that said steel lamellae guide the magnetic flux of the stator yoke 9 from the stator pole 11 to the stator pole 12 past the permanent magnet 6, said flux being generated by means of the coil 17 that can be energized.

Figure 3A:
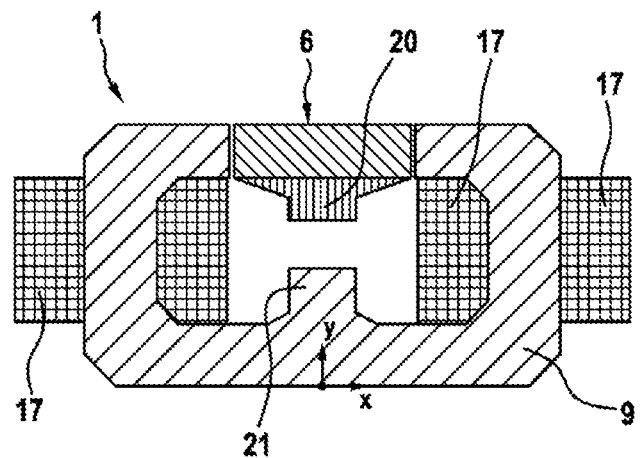
Figure 3B:
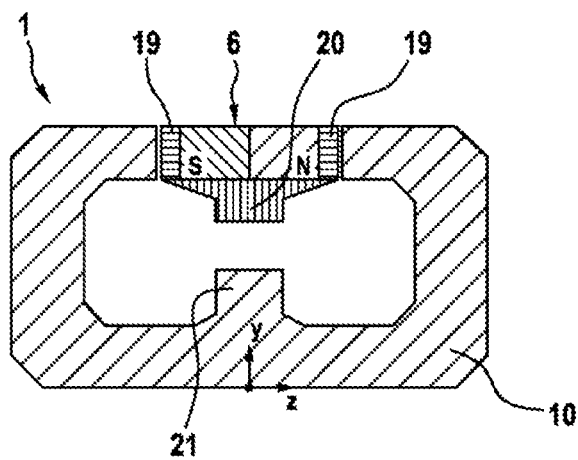

FIGS. 3A and 3B illustrate particular, simplified sectional views of the linear machine 1, wherein FIG. 3A illustrates a section through the plane of the stator yoke 9 and FIG. 3B illustrates a section through the plane of the stator yoke 10. It is evident in FIGS. 3A and 3B that the stator 2 of the linear machine 1 comprises a central section having a reduced spacing. This spacing is formed by virtue of the fact that on one hand the permanent magnet 6 is provided on its inner side with a lamellae package 20 and that the stator yokes 9, 10 are provided with a projection 21 on the side that lies opposite the permanent magnet 6, said projection protruding inwards, as a result of which the spacing of the annular stator yoke 9, 10 with respect to the permanent magnet 6 is reduced. The steel lamellae package 20 is embodied in such a manner that its steel lamellae extend transverse or perpendicular with respect to the magnetic axis of the permanent magnet 6 and in this respect are aligned parallel to the steel lamellae of the steel lamellae packages 19.

Figure 4A:
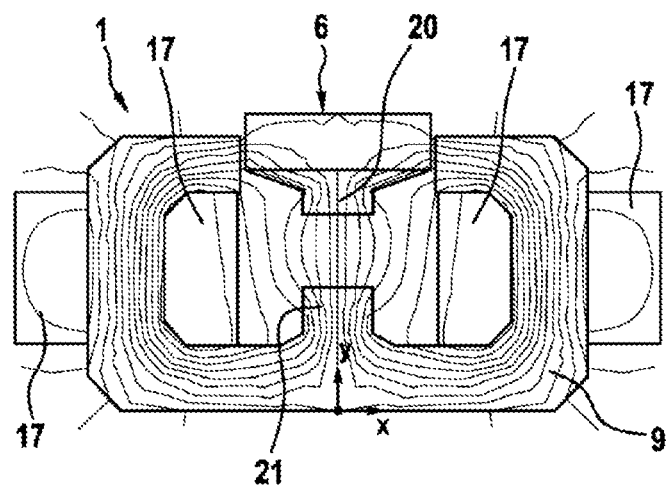
Figure 4B:
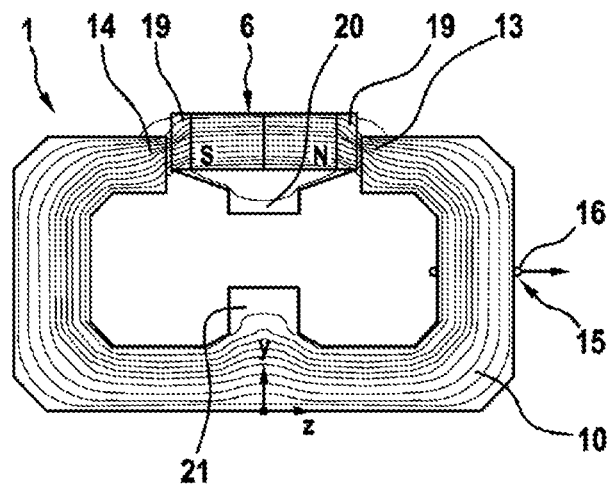

FIGS. 4A and 4B illustrate simulated magnetic fluxes through the stator yokes 9, 10 (in the so-called d and q axis).

The magnetic flux that is generated by the permanent magnet 6 in accordance with FIG. 4B extends from the magnetic north pole N, through a first steel lamellae package 19, an air gap and into the stator yoke 10, and from there through a second air gap into the second lamellae package 19 and back into the magnetic south pole S, as a result of which a closed magnetic circuit is formed. The steel lamellae package 20 prevents a short circuit of the magnetic flux. The magnetic conductivity $\mu_R$ occurs in particular in dependence upon the number and thickness of the steel lamellae. A magnetic force is generated on the permanent magnet 6 in the direction of the armature axis 7, as a result of the relocation, to achieve a minimal magnetic resistance in the air gap. As a consequence, the permanent magnet 6 having the armature 3 is relocated axially along the armature axis 7 perpendicular to the magnetic flux that is excited by means of the permanent magnet 6 or is moved into a resting position in which the magnetic flux comprises the lowest resistance. The magnetic flux through the stator yoke 10 changes in dependence upon the position of the permanent magnet 6 with respect to the stator poles 13, 14. This is ascertained by means of the sensor device 15. It is possible to determine a change in the position of the permanent magnet 6 and thereby the armature 3 in dependence upon the magnetic flux that is changing. Consequently, it is possible to precisely determine the position of the armature 3 by means of the sensor device 15 having the sensor coil 17. It is preferred that the sensor coil 16 is not energized for this purpose. As a consequence, the position or orientation of the armature is ascertained independently of a current supply.

Since the magnetic axis of the permanent magnet 6 generates a magnetic flux only the stator yoke 10, its magnetic permeability $\mu_R$ perpendicular to the magnetic axis is approximately 1.05, which corresponds approximately to the magnetic conductivity (permeability) of air. The steel lamellae packages 19 have a degree of permeability according to the selected steel.

The coil 17 that can be energized is embodied in such a manner that the magnetic flux that is generated by means of said coil generates a force in the direction of the armature axis 7, said force being counteracted by the force is generated by means of the permanent magnet 6 and is described above. The magnetic force is a longitudinally-acting force, as illustrated in FIG. 4A, while the magnetic force through the permanent magnet 6 is a transversal force, as is illustrated in FIG. 4B.

When operating the linear machine 1 by means of a control unit E that evaluates the measured values of the sensor device 15 and accordingly energizes the coil 17, the armature 6 is consequently moved by means of the permanent magnet in a first direction out of the stator 2 and is moved into the stator by means of energizing the coil 17, wherein it is possible by means of the sensor device 15 to determine the prevailing position of the armature 3 in a simple manner, and thereby it is possible to control or energize the coil 17 in a precise manner for an oscillating operation of the linear machine 1. The linear machine 1 is embodied in such a manner that a magnetically neutral resting position of the permanent magnet 6, said resting position being caused by means of the permanent magnet, differs from a magnetically neutral resting position of the permanent magnet 6, said resting position occurring by means of energizing the coil 17. If the coil 17 is not energized, the permanent magnet 6 thus moves the armature 3 into its first neutral resting position. The permanent magnet 6 is then moved by means of energizing the coil 17 in the direction of the resting position that is caused by means of the energized coil 17. As a consequence, the armature is always relocated into the correct or the desired position if the coil 17 is energized. The coil 17 is embodied by way of example as a copper winding, by way of example having sixty windings.

If the armature 3 begins to oscillate, this occurs in the direction of the stator 2 or in the direction of the projection 21. If the armature 3 owing to its acceleration exceeds the neutral resting position of the armature 3, which is caused by means of the coil that can be energized, the force ratios thus change in such a manner that the armature 3 is braked and is accelerated in the opposing direction. This effect aids braking the armature 3 prior to said armature reaching the projection 21 so that a mechanical jam or mechanical contact of the armature and stator 2 is prevented. The resilient element 9 supports the oscillating movement.

FIG. 5 illustrates a second exemplary embodiment of the linear machine 1, wherein elements that are already known from the preceding figures are provided with identical reference numerals so that in this respect reference is made to the above description. Hereinunder, reference is only to be made to the differences.

The exemplary embodiment of the linear machine 1 in FIG. 5 differs from the preceding exemplary embodiment by virtue of the fact that the stator 2 comprises a second coil 23 in addition to the coil 17, said second coil being allocated to the first stator yoke 9. FIG. 5 illustrates in this respect a longitudinal section of the linear machine 1 through the plane of the stator yoke 9, as is also the case in FIGS. 3A and 4A. The two coils 17, 23 are separated from one another by means of a steel lamellae package ring 24 in the direction of the armature axis 7. The steel lamellae package ring 24 forms the stator poles 11, 12 of the stator yoke 9, said stator poles being allocated to the permanent magnet 6. The operation of the linear machine 1 in accordance with the second exemplary embodiment corresponds essentially to that of the first exemplary embodiment, wherein the two coils 17 and 23 can be energized independently of one another in order to control the oscillating movement of the armature 3.

Fundamentally, the permanent magnet 6 is preferably a rare earth magnet, in particular NdFe35. In accordance with the second exemplary embodiment, the resilient element 8 is omitted. The resilient element 8 could also be omitted from the first exemplary embodiment. Likewise, the oscillating movement of the linear machine 1 can be supported in the second exemplary embodiment by means of providing the resilient element 8. In each case, a hybrid linear reluctance motor or a hybrid linear reluctance machine is formed and said reluctance motor or reluctance machine is operated on the one hand by means of an electrically excited magnetic flux and on the other hand by means of a magnetic flux that is excited by a permanent magnet.

The invention claimed is:

1. An electrical linear machine, comprising:
    an armature that is axially displaceable relative to a housing, and that includes a permanent magnet having a magnetic north pole and a magnetic south pole; and
    a stator that is fixed to the housing, and that includes:
        a first stator yoke that has a first pair of stator poles; and
        a second stator yoke that has a second pair of stator poles, the second stator yoke rotationally offset from the first stator yoke such that the first and second pairs of stator poles are distributed radially and uniformly around the armature,
    wherein:
        only the first stator yoke includes at least one coil configured to be energized; and
        energizing the at least one coil generates a first magnetic flux through the first stator yoke and the permanent magnet, and
    wherein the permanent magnet is fixed at an orientation such that the magnetic north pole of the permanent magnet is facing toward a first stator pole of the second pair of stator poles, and such that the magnetic south pole of the permanent magnet is facing toward a second stator pole of the second pair of stator poles, so that the permanent magnet generates a second magnetic flux through the second stator yoke.

2. The linear machine as claimed in claim 1, further comprising:
    at least one resilient element that applies an axial biasing force to the armature such that when the at least one coil is not energized, the permanent magnet is in a position located outside a first magnetically neutral resting position.

3. The linear machine as claimed in claim 1, wherein:
    the permanent magnet generates a first magnetic force that biases the armature toward a first magnetically neutral resting position;
    the first magnetic flux generated through the first stator yoke via energizing of the at least one coil generates a second magnetic force that counteracts the first magnetic force and biases the armature toward a second magnetically neutral resting position: and
    the first and second magnetic resting positions are axially spaced apart from each other.

4. The linear machine as claimed in claim 1, further comprising:
    at least one steel lamellae package positioned on the permanent magnet and configured to guide the first magnetic flux.

5. The linear machine as claimed in claim 4, wherein:
    a respective steel lamellae package of the at least one steel lamellae package is positioned on each of the magnetic north pole of the permanent magnet and the magnetic south pole of the permanent magnet; and
    steel lamellae of the respective lamellae package extend perpendicular to the second magnetic flux.

6. The linear machine as claimed in claim 1, wherein:
    each of the first and second stator yokes has an open ring shape; and
    free ends of the open ring shape of each of the first and second stator yokes form the first and second pairs of stator poles, respectively.

7. The linear machine as claimed in claim 1, further comprising:
    a sensor device is configured to sense the second magnetic flux passing through the second yoke.

8. The linear machine as claimed in claim 7, further comprising:
    a control unit configured to energize the at least one coil with reference to the sensed second magnetic flux.

9. The linear machine as claimed in claim 7, wherein the sensor device has a stator coil.

10. The linear machine as claimed in claim 1, wherein:
    the permanent magnet includes a steel lamellae package on an axial end face that faces inwards toward the first stator yoke; and
    steel lamellae of the steel lamellae package extend perpendicularly to the second magnetic flux.

11. The linear machine as claimed in claim 1, wherein:
the first stator yoke includes a first coil configured to be energized, and a second coil configured to be energized
the first coil and the second coil are separated from each other by a steel lamellae package ring;
the permanent magnet generates a first magnetic force that biases the armature toward a first magnetically neutral resting position; and
the steel lamellae package ring is positioned so as to be a region of the permanent magnet when the armature is in the first magnetically neutral resting position.

\* \* \* \* \*

UNITED STATES PATENT AND TRADEMARK OFFICE
CERTIFICATE OF CORRECTION

PATENT NO. : 10,541,594 B2
APPLICATION NO. : 15/324692
DATED : January 21, 2020
INVENTOR(S) : Paweletz et al.

Page 1 of 1

It is certified that error appears in the above-identified patent and that said Letters Patent is hereby corrected as shown below:

On the Title Page

At item (57), in Line 4 of the abstract, "a first stator yolk" should read --a first stator yoke--.

At item (57), in Lines 4-5 of the abstract, "the stator yolks" should read --the stator yokes--.

In the Claims

In Claim 11, at Column 9, Line 3: "a second coil configured to be energized" should read --a second coil configured to be energized;--.

Signed and Sealed this
Thirty-first Day of March, 2020

Andrei Iancu
*Director of the United States Patent and Trademark Office*